(12) United States Patent
Fox et al.

(10) Patent No.: US 12,223,977 B2
(45) Date of Patent: Feb. 11, 2025

(54) AUDIO SIGNAL PROCESSING METHOD AND SYSTEM FOR ECHO MITIGATION USING AN ECHO REFERENCE DERIVED FROM AN INTERNAL SENSOR

(71) Applicant: Analog Devices International Unlimited Company, Limerick (IE)

(72) Inventors: Charles Fox, Brussels (BE); Jean-Marc Luneau, Brussels (BE)

(73) Assignee: Analog Devices International Unlimited Company, Limerick (IE)

( * ) Notice: Subject to any disclaimer, the term of this patent is extended or adjusted under 35 U.S.C. 154(b) by 263 days.

(21) Appl. No.: 17/883,329

(22) Filed: Aug. 8, 2022

(65) Prior Publication Data

US 2024/0046945 A1 Feb. 8, 2024

(51) Int. Cl.
*G10L 21/0232* (2013.01)
*G10L 21/0208* (2013.01)

(52) U.S. Cl.
CPC *G10L 21/0232* (2013.01); *G10L 2021/02082* (2013.01)

(58) Field of Classification Search
CPC ....... G10L 21/0232; G10L 2021/02082; G10L 2021/02165; G10L 21/0208; H04M 9/082; H04R 3/005; H04R 3/02; H04R 2460/13
See application file for complete search history.

(56) References Cited

U.S. PATENT DOCUMENTS 8,175,871 B2 * 5/2012 Wang .................... H04M 9/082
379/406.01
10,109,292 B1 * 10/2018 Choisel .................... H04R 3/04
(Continued)

FOREIGN PATENT DOCUMENTS

WO 2024033019 2/2024

OTHER PUBLICATIONS

"International Application Serial No. PCT/EP2023/069682, International Search Report mailed Oct. 4, 2023", 5 pgs.
(Continued)

*Primary Examiner* — Bhavesh M Mehta
*Assistant Examiner* — Darioush Agahi
(74) *Attorney, Agent, or Firm* — Schwegman Lundberg & Woessner, P.A.

(57) ABSTRACT

Disclosed is an audio signal processing method implemented by an audio system including at least an internal sensor, an external sensor and a speaker unit. The audio signal processing method includes: producing internal and external audio signals by measuring simultaneously acoustic signals reaching the internal sensor and acoustic signals reaching the external sensor, respectively; converting the internal audio signal to frequency domain, thereby producing an internal audio spectrum; converting the external audio signal to frequency domain, thereby producing an external audio spectrum; estimating, based on the internal audio spectrum, an echo audio spectrum of an echo audio signal caused by the speaker unit in the external audio signal, wherein the echo audio spectrum is estimated for frequencies above a minimum frequency, wherein the minimum frequency≥600 hertz; and correcting the external audio spectrum for frequencies above the minimum frequency, based on the echo audio spectrum.

21 Claims, 3 Drawing Sheets

(56) References Cited

U.S. PATENT DOCUMENTS

| | | | |
|---|---|---|---|
| 11,107,488 B1 * | 8/2021 | Mansour | H04R 1/406 |
| 11,290,802 B1 * | 3/2022 | Nandy | G10L 15/08 |
| 2008/0037801 A1 * | 2/2008 | Alves | H04R 3/04 |
| | | | 381/74 |
| 2009/0010444 A1 * | 1/2009 | Goldstein | H04R 3/00 |
| | | | 381/110 |
| 2015/0215700 A1 * | 7/2015 | Sun | H04R 3/002 |
| | | | 381/94.2 |
| 2019/0342652 A1 | 11/2019 | Watts et al. | |
| 2020/0020313 A1 | 1/2020 | Hua et al. | |
| 2021/0092233 A1 | 3/2021 | Hua et al. | |

OTHER PUBLICATIONS

"International Application Serial No. PCT/EP2023/069682, Written Opinion mailed Oct. 4, 2023", 8 pgs.

* cited by examiner

AUDIO SIGNAL PROCESSING METHOD AND SYSTEM FOR ECHO MITIGATION USING AN ECHO REFERENCE DERIVED FROM AN INTERNAL SENSOR

BACKGROUND OF THE INVENTION

Field of the Invention

The present disclosure relates to audio signal processing and relates more specifically to a method and computing system for mitigating an echo in an audio signal provided by an external sensor, caused by a speaker unit, by using an audio signal provided by an internal sensor.

The present disclosure finds an advantageous application, although in no way limiting, in wearable devices such as earbuds or earphones or smart glasses used to pick-up voice for a voice call established using any voice communicating device, or for voice commands.

Description of the Related Art

To improve picking up a user's voice in noisy environments, wearable devices like earbuds or earphones are typically equipped with different types of audio sensors such as microphones and/or accelerometers.

On a small wearable device such as an earbud, there is a very short acoustic path between a speaker unit of the earbud and the audio sensors that pick-up the user's voice. As a consequence, the audio sensors may also pick-up the acoustic signal output by the speaker unit at possibly high volume.

During a voice call, the speaker unit outputs the far-end speaker's voice for the user of the earbud. Due to the very short acoustic path between the speaker unit and the audio sensors that pick-up the user's voice, the audio sensors may also pick-up the far-end speaker's voice, from the speaker unit, which is then returned (with the user's voice) to the far-end speaker. This produces an echo for the far-end speaker who will then hear its own voice.

In order to prevent the far-end speaker from hearing its own voice, it is known to implement an echo mitigation algorithm on the earbud of the user. This echo mitigation algorithm uses the speaker audio signal played by the speaker unit (i.e. the audio signal converted by the speaker unit into an acoustic signal) as an echo reference to reduce the echo affecting the audio signals produced by the various audio sensors of the earbud. In the present disclosure, an echo mitigation algorithm can implement echo cancellation and/or echo suppression. An echo cancellation algorithm typically estimates the echo affecting an audio signal and removes the estimated echo from the audio signal affected by said echo (typically by subtracting said estimated echo), in principle without modifying the useful part of the audio signal. An echo cancellation algorithm can use e.g. an adaptive linear filter. Such an adaptive linear filter is applied to the speaker audio signal and is dynamically adapted by minimizing a power of a difference between the filtered speaker audio signal and the audio signal provided by an audio sensor of the earbud. The filtered speaker audio signal is then subtracted from the audio signal of the audio sensor, thereby reducing the echo in said audio signal of the audio sensor without reducing the useful part of the audio signal (in principle). An echo suppression algorithm attenuates the frequency components of the audio signal which are strongly affected by echo, thereby also attenuating the useful part of the audio signal in the attenuated frequency components of the audio signal.

However, existing echo mitigation algorithms can usually only handle a certain amount of echo either because the echo level is really high, or because it contains components which are non-linear with respect to the speaker audio signal used as echo reference and that cannot be modelled by standard echo cancellation algorithms based on adaptive linear filtering. Non-linear components of the echo are due inter alia to the speaker unit's response and to vibrations of the earbud caused by the speaker unit, which propagate to the audio sensors. Echo suppression algorithms can be used for reducing non-linearities. However, conventional echo suppression algorithms are not easy to tune and not always reliable, and they often impact near-end voice (i.e. the user's voice) and the naturalness of the ambient noise reduction.

Accordingly, there is a need for a solution enabling to enhance echo mitigation in audio signals provided by an audio sensor of a wearable device such as e.g. an earbud, in particular for enhancing the reduction of components of the echo which are non-linear with respect to the speaker audio signal fed to the speaker unit.

SUMMARY OF THE INVENTION

The present disclosure aims at improving the situation. In particular, the present disclosure aims at overcoming at least some of the limitations of the prior art discussed above, by proposing a solution enabling to enhance echo mitigation in wearable audio devices such as e.g. earbuds.

For this purpose, and according to a first aspect, the present disclosure relates to an audio signal processing method implemented by an audio system which comprises at least an internal sensor, an external sensor and a speaker unit, wherein the internal sensor is arranged to measure voice acoustic signals emitted by a user of the audio system which reach the internal sensor by propagating internally to a head of the user and the external sensor is arranged to measure voice acoustic signals emitted by the user which reach the external sensor by propagating externally to the user's head, wherein the audio signal processing method comprises:

producing an internal audio signal and an external audio signal by measuring simultaneously acoustic signals reaching the internal sensor and acoustic signals reaching the external sensor, respectively, converting the internal audio signal to frequency domain, thereby producing an internal audio spectrum, converting the external audio signal to frequency domain, thereby producing an external audio spectrum, estimating, based on the internal audio spectrum, an echo audio spectrum of an echo audio signal caused by the speaker unit in the external audio signal, wherein the echo audio spectrum is estimated for frequencies above a minimum frequency, wherein the minimum frequency is greater than or equal to 600 hertz (Hz), correcting the external audio spectrum for frequencies above the minimum frequency, based on the echo audio spectrum.

Indeed, most recent wearables audio devices (earbuds, earphones, smart glasses, etc.) are equipped with at least two types of audio sensors. One audio sensor, referred to as external sensor, picks up mainly air-conducted voice. Another audio sensor, referred to as internal sensor, picks up mainly bone-conducted voice. An external sensor is typically an air conduction sensor (e.g. microphone), while an internal sensor can be either an air conduction sensor arranged for instance in an ear canal of the user (a.k.a. feedback sensor) or a bone conduction sensor (e.g. accelerometer, vibration sensor). Compared to an external sensor, an internal sensor picks up the user's voice with less ambient noise but with a limited spectral bandwidth.

Both the external sensor and the internal sensor may pick-up the acoustic signal output by the speaker unit. This is particularly the case for the internal sensor since it is usually arranged close to the speaker unit (both arranged in the user's ear canal in case of a feedback sensor).

Hence, the internal audio signal produced by the internal sensor is affected by echo as well as the external audio signal produced by the external sensor. The inventors have noticed that the internal audio signal produced by an internal sensor typically contains:
ambient noise mainly in low frequencies,
bone-conducted voice mainly in low frequencies,
echo in all the spectral bandwidth of the internal sensor.

If the internal sensor is an air conduction sensor (microphone) then the low frequencies, which include ambient noise and bone-conducted voice, can go up 1-2 kilohertz (kHz). If the internal sensor is a bone conduction sensor (accelerometer, vibration sensor) then the low frequencies, which include ambient noise and bone-conducted voice, can go up to 600 Hz-1 kHz.

Hence, in high frequencies (e.g. above 1-2 kHz), such an internal sensor picks-up mostly echo. Compared to the speaker audio signal used as echo reference in prior art solutions, the internal audio signal corresponds to the measurement of acoustic signals representative of the speaker unit's response and of the vibrations of the internal sensor caused by the speaker unit. Hence, the echo in the internal audio signal includes linear components but also the non-linear components that cannot be modeled by prior art solutions relying on an adaptive linear filter applied to the speaker audio signal fed to the speaker unit.

Hence, it is proposed to use the internal audio signal as echo reference for mitigating the echo in the external audio signal for at least high frequencies (above a minimum frequency which is for instance in [600 Hz, 2.5 kHz], preferably in [1 kHz, 2 kHz]), where the internal audio signal can advantageously enhance echo mitigation compared to prior art solutions. In particular, using the internal audio signal as echo reference enables to cancel components which are non-linear with respect to the speaker audio signal fed to the speaker unit.

It should be noted that the proposed solution can be used alone or in combination with conventional echo cancellation algorithms which use the speaker audio signal as echo reference. Also, the proposed solution can be used when it is not possible to use the speaker audio signal as echo reference, for instance when it is not possible to access the input of the speaker unit.

In some cases, audio signals from the internal sensor and the external sensor can be mixed together for mitigating noise, by using the internal audio signal mainly for low frequencies while using the external audio signal for higher frequencies. Hence, in such cases, high frequencies correspond to the useful part of the external audio spectrum. Accordingly, high frequencies of the external audio signal are actually where echo cancellation enhancement is the most beneficial, at least when audio signals from the internal sensor and the external sensor are subsequently mixed together.

In specific embodiments, the audio signal processing method may further comprise one or more of the following optional features, considered either alone or in any technically possible combination.

In specific embodiments, the audio signal processing method further comprises producing an output signal by combining the internal audio signal and the external audio signal obtained after correcting the external audio spectrum based on the echo audio spectrum.

In specific embodiments, the internal audio signal and the external audio signal obtained after correcting the external audio spectrum based on the echo audio spectrum are combined in frequency domain by combining the internal audio spectrum and the external audio spectrum obtained after correction based on the echo audio spectrum, thereby producing an output audio spectrum.

In specific embodiments, the output audio spectrum corresponds to the external audio spectrum obtained after correction based on the echo audio spectrum for frequencies above the minimum frequency.

In specific embodiments, the audio signal processing method further comprises converting to time domain the external audio spectrum obtained after correction based on the echo audio spectrum, and the internal audio signal and the external audio signal obtained after correcting the external audio spectrum based on the echo audio spectrum are combined in time domain.

In specific embodiments:
the internal audio spectrum, the external audio spectrum and the echo audio spectrum are complex spectra, and
correcting the external audio spectrum based on the echo audio spectrum comprises subtracting the echo audio spectrum from the external audio spectrum for frequencies above the minimum frequency.

In specific embodiments, the echo audio spectrum is estimated by filtering the internal audio spectrum by a frequency domain adaptive filter.

In specific embodiments, correcting the external audio spectrum based on the echo audio spectrum comprises:
computing echo suppression gains based on the external audio spectrum and based on the echo audio spectrum, for frequencies above the minimum frequency, and
applying the echo suppression gains to the external audio spectrum, for frequencies above the minimum frequency.

In specific embodiments, the audio signal processing method further comprises performing echo cancellation on the external audio signal based on a speaker audio signal, before correcting the external audio spectrum based on the echo audio spectrum estimated based on the internal audio spectrum. Hence, the proposed echo mitigation (cancellation or suppression) solution, which relies on the internal audio signal as echo reference, can be used alone or in combination with conventional echo cancellation algorithms which use the speaker audio signal as echo reference.

In specific embodiments, performing echo cancellation on the external audio signal based on the speaker audio signal comprises filtering the speaker audio signal by a first adaptive filter and correcting the external audio signal based on the filtered speaker audio signal.

In specific embodiments, the audio signal processing method further comprises performing echo cancellation on the internal audio signal based on the speaker audio signal, before estimating the echo audio spectrum based on the internal audio spectrum.

In specific embodiments, performing echo cancellation on the internal audio signal based on the speaker audio signal comprises filtering the speaker audio signal by a second adaptive filter and correcting the internal audio signal based on the filtered speaker audio signal.

In specific embodiments:
the audio signal processing method further comprises determining whether an echo audio signal is present, and
the correction of the external audio spectrum, based on the echo audio spectrum estimated based on the internal audio spectrum, is performed only when it is determined that an echo audio signal is present.

According to a second aspect, the present disclosure relates to an audio system comprising at least an internal sensor, an external sensor and a speaker unit, wherein the internal sensor is arranged to measure voice acoustic signals emitted by a user of the audio system which reach the internal sensor by propagating internally to a head of the user and the external sensor is arranged to measure voice acoustic signals emitted by the user which reach the external sensor by propagating externally to the user's head, wherein the internal sensor and the external audio sensor are configured to produce an internal audio signal and an external audio signal by measuring simultaneously acoustic signals reaching the internal sensor and acoustic signals reaching the external sensor, respectively, wherein said audio system further comprises a processing circuit configured to:
convert the internal audio signal to frequency domain, thereby producing an internal audio spectrum,
convert the external audio signal to frequency domain, thereby producing an external audio spectrum,
estimate, based on the internal audio spectrum, an echo audio spectrum of an echo audio signal caused by the speaker unit in the external audio signal, wherein the echo audio spectrum is estimated for frequencies above a minimum frequency, wherein the minimum frequency is greater than or equal to 600 Hz,
correct the external audio spectrum for frequencies above the minimum frequency, based on the echo audio spectrum.

According to a third aspect, the present disclosure relates to a non-transitory computer readable medium comprising computer readable code to be executed by an audio system comprising at least an internal sensor, an external sensor and a speaker unit, wherein the internal sensor is arranged to measure voice acoustic signals emitted by a user of the audio system which reach the internal sensor by propagating internally to a head of the user and the external sensor is arranged to measure voice acoustic signals emitted by the user which reach the external sensor by propagating externally to the user's head, wherein said audio system further comprises a processing circuit, wherein said computer readable code causes said audio system to:
produce an internal audio signal and an external audio signal by measuring simultaneously acoustic signals reaching the internal sensor and acoustic signals reaching the external sensor, respectively,
convert the internal audio signal to frequency domain, thereby producing an internal audio spectrum,
convert the external audio signal to frequency domain, thereby producing an external audio spectrum,
estimate, based on the internal audio spectrum, an echo audio spectrum of an echo audio signal caused by the speaker unit in the external audio signal, wherein the echo audio spectrum is estimated for frequencies above a minimum frequency, wherein the minimum frequency is greater than or equal to 600 Hz,
correct the external audio spectrum for frequencies above the minimum frequency, based on the echo audio spectrum.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

Also, the order of steps represented in these figures is provided only for illustration purposes and is not meant to limit the present disclosure which may be applied with the same steps executed in a different order.

DESCRIPTION OF THE PREFERRED EMBODIMENTS

Figure 1:
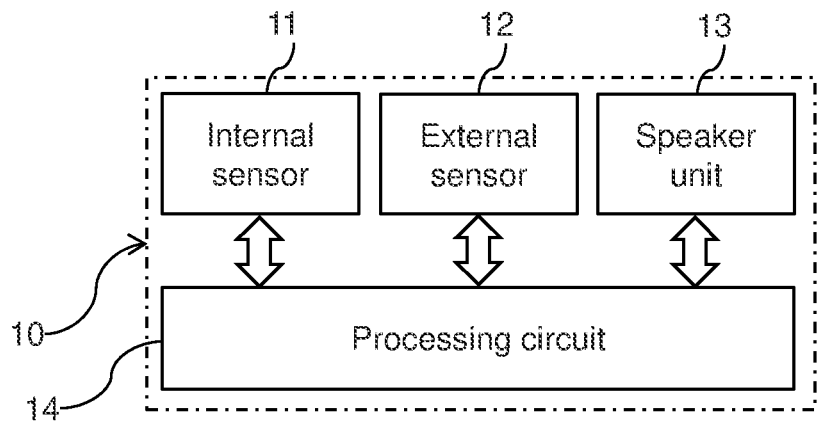
FIG. 1: a schematic representation of an exemplary embodiment of an audio system.

FIG. 1 represents schematically an exemplary embodiment of an audio system 10. In some cases, the audio system 10 is included in a device wearable by a user. In preferred embodiments, the audio system 10 is included in earbuds or in earphones or in smart glasses.

As illustrated by FIG. 1, the audio system 10 comprises at least two audio sensors which are configured to measure voice acoustic signals emitted by the user of the audio system 10.

One of the audio sensors is referred to as internal sensor 11. The internal sensor 11 is referred to as "internal" because it is arranged to measure voice acoustic signals emitted by the user which propagate internally through the user's head. For instance, the internal sensor 11 may be an air conduction sensor (e.g. microphone) to be located in an ear canal of a user and arranged on the wearable device towards the interior of the user's head, or a bone conduction sensor (e.g. accelerometer, vibration sensor). Hence, the internal sensor 11 measures at least bone-conducted voice but it may also, depending e.g. on its type, measure a mix of bone-conducted and air-conducted voice. The internal sensor 11 may be any type of bone conduction sensor or air conduction sensor known to the skilled person.

The other audio sensor is referred to as external sensor 12. The external sensor 12 is referred to as "external" because it is arranged to measure voice acoustic signals emitted by the user which propagate externally to the user's head (via the air between the user's mouth and the external sensor 12). The external sensor 12 is an air conduction sensor (e.g. microphone) to be located outside the ear canals of the user, or to be located inside an ear canal of the user but arranged on the wearable device towards the exterior of the user's head. Hence, the external sensor 12 measures only air-conducted voice. The external sensor 12 may be any type of air conduction sensor known to the skilled person.

As illustrated by FIG. 1, the audio system 10 comprises also at least one speaker unit 13. In a conventional manner, each speaker unit 13 receives as input an audio signal, referred to as speaker audio signal, and converts into an acoustic signal (wave), referred to as speaker acoustic signal.

For instance, if the audio system 10 is included in a pair of earbuds (one earbud for each ear of the user), then the internal sensor 11 is for instance arranged with the speaker unit 13 in a portion of one of the earbuds that is to be inserted in the user's ear, while the external sensor 12 is for instance arranged in a portion of one of the earbuds that remains outside the user's ears. In some cases, the audio system 10 may comprise two or more internal sensors 11 (for instance one or two for each earbud) and/or two or more external sensors 12 (for instance one for each earbud) and/or two or more speaker units 13 (for instance one for each earbud).

As illustrated by FIG. 1, the audio system 10 comprises also a processing circuit 14 connected to the internal sensor 11 and to the external sensor 12. The processing circuit 14 is configured to receive and to process the audio signals produced by the internal sensor 11 and by the external sensor 12. In the non-limitative example illustrated by FIG. 1, the processing circuit 14 is also connected to the speaker unit(s) 13. In such a case, the processing circuit 14 may have access to (and may even generate) the speaker audio signal(s) played by the speaker unit(s) 13. It should be noted that the present disclosure can also be applied when the processing circuit 14 is not connected to the speaker unit(s) 13 and/or when said processing circuit 14 does not have access to the speaker audio signal(s) played by the speaker unit(s) 13.

In some embodiments, the processing circuit 14 comprises one or more processors and one or more memories. The one or more processors may include for instance a central processing unit (CPU), a graphical processing unit (GPU), a digital signal processor (DSP), a field-programmable gate array (FPGA), an application specific integrated circuit (ASIC), etc. The one or more memories may include any type of computer readable volatile and non-volatile memories (magnetic hard disk, solid-state disk, optical disk, electronic memory, etc.). The one or more memories may store a computer program product (software), in the form of a set of program-code instructions to be executed by the one or more processors in order to implement all or part of the steps of an audio signal processing method 20.

Figure 2:
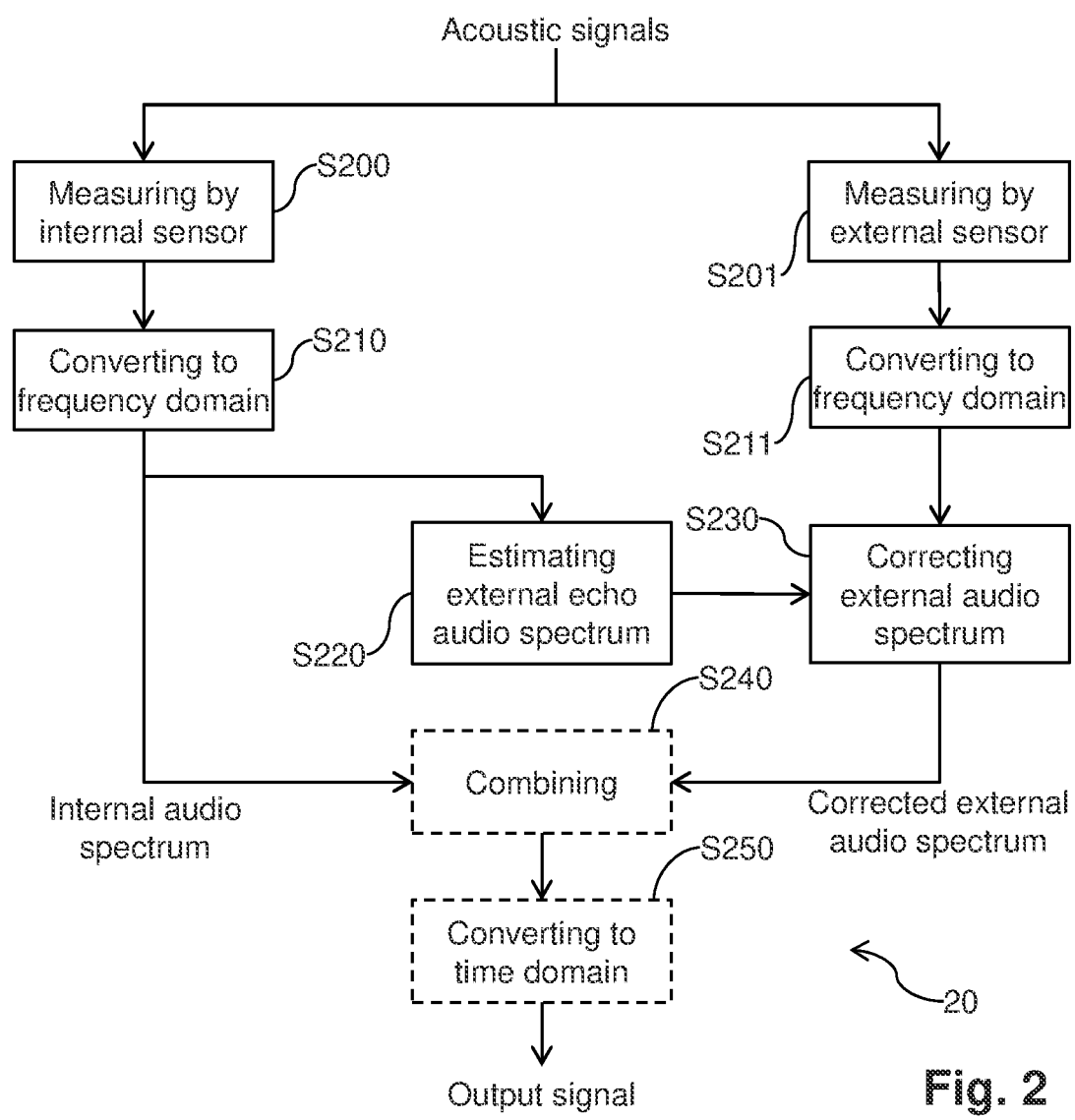
FIG. 2: a diagram representing the main steps of a first exemplary embodiment of an audio signal processing method.

FIG. 2 represents schematically the main steps of an exemplary embodiment of an audio signal processing method 20 for cancelling echo, which are carried out by the audio system 10.

As illustrated by FIG. 2, the internal sensor 11 measures acoustic signals reaching said internal sensor 11, thereby producing an audio signal referred to as internal audio signal (step S200). Simultaneously, the external sensor 12 measures acoustics signals reaching said external sensor 12, thereby producing an audio signal referred to as external audio signal (step S201). The acoustic signals reaching the internal sensor 11 and the external sensor 12 may or may not include a voice acoustic signal emitted by the user, with the presence of a voice activity varying over time as the user speaks.

During e.g. a voice call, the speaker unit 13 typically emits a speaker acoustic signal (which or may not include the far-end speaker's voice). In this case, the acoustic signals reaching the internal sensor 11 and the external sensor 12 may or may not include the speaker acoustic signal emitted by the speaker unit 13, with the internal sensor 11 typically picking up more the speaker acoustic signal than the external sensor 12, since the internal sensor 11 is usually much closer to the speaker unit 13 than the external sensor 12. Also, in case of e.g. an earbud tightly fit in the ear canal of the user, the ear canal may be sealed by the earbud thereby strongly attenuating the speaker acoustic signal leaking outside the ear canal towards the external sensor 12.

As illustrated by FIG. 2, the audio signal processing method 20 comprises a step S210 of converting the internal audio signal to frequency domain, executed by the processing circuit 14, which produces an audio spectrum referred to as internal audio spectrum. Similarly, the audio signal processing method 20 comprises a step S211 of converting the external audio signal to frequency domain, executed by the processing circuit 14, which produces an audio spectrum referred to as external audio spectrum.

Indeed, the internal audio signal and the external audio signal are in time domain and steps S210 and S211 aim at performing a spectral analysis of the internal and external audio signals to obtain respective audio spectra in frequency domain. In some examples, steps S210 and S211 may for instance use any time to frequency conversion method, for instance a fast Fourier transform (FFT), a discrete Fourier transform (DFT), a discrete cosine transform (DCT), a wavelet transform, etc. In other examples, steps S210 and S211 may for instance use a bank of bandpass filters which filter the audio signals in respective frequency sub-bands of a same frequency band, etc.

For instance, the internal and external audio signals may be sampled at e.g. 16 kilohertz (kHz) and buffered into time-domain audio frames of e.g. 4 milliseconds (ms). For instance, it is possible to apply on these audio frames a 128-point DCT or FFT to produce audio spectra up to the Nyquist frequency $f_{Nyquist}$, i.e. half the sampling rate (i.e. 8 kHz if the sampling rate is 16 kHz).

In the sequel, we assume in a non-limitative manner that the frequency band on which are determined the internal audio spectrum and the external audio spectrum are composed of N discrete frequency values $f_n$ with $1 \leq n \leq N$, wherein $f_{n-1} < f_n$ for any $2 \leq n \leq N$. For instance, $f_1 = 0$ and $f_N = f_{Nyquist}$, but the spectral analysis may also be carried out on a frequency sub-band in $[0, f_{Nyquist}]$ For instance, $f_1 = 0$ and $f_N$ is lower than or equal to 4000 Hz, or lower than or equal to 3000 Hz. It should be noted that the determination of the audio spectra may be performed with any suitable spectral resolution. Also, the frequencies $f_n$ may be regularly spaced in some embodiments or irregularly spaced in other embodiments.

The internal audio spectrum $S_I$ of the internal audio signal $s_I$ corresponds to a set of values $\{S_I(f_n), 1 \leq n \leq N\}$. The external audio spectrum $S_E$ of the external audio signal $s_E$ corresponds to a set of values $\{S_E(f_n), 1 \leq n \leq N\}$. Typically, the internal audio spectrum $S_I$ (resp. the external audio spectrum S E) may be a complex spectrum such that $S_I(f_n)$ (resp. $S_E(f_n)$) comprises both:
  a magnitude value representative of the power of the internal audio signal $s_I$ (resp. the external audio signal $s_E$) at frequency $f_n$,
  a phase value of the internal audio signal $s_I$ (resp. the external audio signal $s_E$) at the frequency $f_n$.

For instance, if the audio spectra are computed by an FFT, then $S_I(f_n)$ (resp. $S_E(f_n)$) can correspond to $FFT[s_I](f_n)$ (resp. $FFT[s_E](f_n)$).

It should be noted that, in some embodiments, the internal and external audio spectra can optionally be smoothed over time, for instance by using exponential averaging with a configurable time constant.

As illustrated by FIG. 2, the audio signal processing method 20 comprises a step S220 of estimating, by the processing circuit 14 and based at least on the internal audio spectrum, an echo audio spectrum of an echo audio signal caused by the speaker unit 13 in the external audio signal. Indeed, as discussed above, both the external sensor 12 and the internal sensor 11 may pick-up the speaker acoustic signal emitted by the speaker unit 13, thereby causing the presence of echo in the external audio signal and in the internal audio signal. The internal sensor 11 typically picks up more the speaker acoustic signal than the external sensor 12, and it is proposed to use the internal audio spectrum to estimate the echo audio spectrum in the external audio spectrum, i.e. to estimate the audio spectrum of the part of the external audio signal which represents the measurement of the speaker acoustic signal by the external sensor 12.

As will be discussed hereinbelow, depending on the embodiments, the echo audio spectrum may be a complex spectrum as discussed above (with a magnitude value and a phase value for each considered frequency), or a magnitude spectrum such that it comprises only a magnitude value representative of the estimated power, for each considered frequency, of the echo audio signal included in the external audio signal.

As illustrated by FIG. 2, the audio signal processing method 20 comprises a step S230 of correcting the external audio spectrum, by the processing circuit 14 and based on the estimated echo audio spectrum.

As discussed above, the internal audio signal produced by the internal sensor 11 contains:
- ambient noise mainly in low frequencies, i.e. up to 1-2 kHz for an air conduction sensor and up to 600 Hz-1 kHz for a bone conduction sensor,
- bone-conducted voice mainly in low frequencies, i.e. up to 1-2 kHz for an air conduction sensor and up to 600 Hz-1 kHz for a bone conduction sensor,
- echo in all the spectral bandwidth of the internal sensor 11.

Hence, in high frequencies, the internal sensor 11 picks-up mostly echo. In low frequencies, the internal audio signal also contains audio signals from other sources such that it may be more difficult to estimate accurately the echo in low frequencies by using the internal audio spectrum. Even if the echo audio spectrum may be estimated for both high frequencies and low frequencies, it is preferable to correct the external audio spectrum, based on the estimated echo audio spectrum, only in high frequencies to prevent from injecting low frequency undesirable audio signals (additional noise and/or bone-conducted voice) into the external audio spectrum.

Accordingly, in preferred embodiments, the correction (echo cancellation) of the external audio spectrum based on the estimated echo audio spectrum is carried out only for frequencies above a predetermined minimum frequency $f_{min}$ ($f_1 < f_{min} < f_N$) Basically, the minimum frequency $f_{min}$ is a frequency above which the ambient noise and the user's voice may be considered negligible with respect to echo in the internal audio signal. Hence, the echo audio spectrum is estimated at least for frequencies above the minimum frequency $f_{min}$ (and it can be estimated only for frequencies above the minimum frequency $f_{min}$, i.e. it needs not to be estimated for frequencies below the minimum frequency $f_{min}$ if the correction is carried only for frequencies above the minimum frequency $f_{min}$).

The minimum frequency $f_{min}$ is a predetermined frequency that may depend on the type of the internal sensor 11 (i.e. air conduction sensor or bone conduction sensor). The minimum frequency $f_{min}$ may be greater than or equal to 600 Hz, or preferably greater than or equal to 1 kHz, in particular if the internal sensor 11 is an air conduction sensor. The minimum frequency $f_{min}$ is preferably lower than or equal to 2.5 kHz. For instance, the minimum frequency $f_{min}$ is a predetermined frequency in the frequency range [1 kHz, 2 kHz]. In some embodiments, the minimum frequency $f_{min}$ may be predefined beforehand and remain static (unchanged) over time. In other embodiments, the minimum frequency $f_{min}$ may vary over time according to e.g. operating conditions of the audio system 10. For instance, the minimum frequency $f_{min}$ may vary in the frequency range [1 kHz, 2 kHz] depending on the user's voice activity. For, instance, if it is determined that the user's voice is not present in the audio signals, the minimum frequency $f_{min}$ may be decreased, for instance set to 1 kHz, in order to try and increase the frequency range over which the external audio spectrum is corrected. In turn, if it is determined that the user's voice is present in the audio signals, the minimum frequency $f_{min}$ may be increased, for instance set to 2 kHz, in order to reduce the frequency range over which the external audio spectrum is corrected.

We now present non-limitative exemplary embodiments for steps S220 and S230. We assume in a non-limitative manner that the echo audio spectrum is estimated only above the minimum frequency $f_{min}$ in order to correct the external audio spectrum only above said minimum frequency $f_{min}$. As discussed previously, the internal audio spectrum corresponds mainly to echo above the minimum frequency $f_{min}$. Above the minimum frequency $f_{min}$ (i.e. for $f_{min}$ $f_n$ $f_N$), the internal audio spectrum and the external audio spectrum may be expressed as:

$$S_I(f_n) = E_I(f_n)$$

$$S_E(f_n) = E_E(f_n) + X_E(f_n)$$

wherein:
- $E_I$ corresponds to the echo audio spectrum of the echo audio signal in the internal audio signal, referred to as internal echo audio spectrum,
- $E_E$ corresponds to the echo audio spectrum of the echo audio signal in the external audio signal, referred to as external echo audio spectrum, that we want to estimate during step S220,
- $X_E$ corresponds to the audio spectrum of other audio signals present in the external audio signal (ambient noise, voice, etc.).

The external echo audio spectrum/$E_E$ may be expressed as:

$$E_E(f_n) = G_E(f_n) E_I(f_n)$$

Indeed, as discussed above, the internal audio signal in high frequencies includes the non-linear components that cannot be modeled by prior art solutions. Hence, the non-linear components are present in the internal echo audio spectrum $E_I$ such that the difference between $E_I(f_n)$ and $E_E(f_n)$ may be modeled by a complex weight $G_E(f_n)$.

Accordingly, in order to estimate the external echo audio spectrum $E_E$, it is possible to estimate each complex weight $G_E(f_n)$ (or only its magnitude, depending on the embodiments). The estimated external echo audio spectrum, designated by $\hat{E}_E$, can then be computed as:

$$\hat{E}_E(f_n) = \hat{G}_E(f_n) S_I(f_n)$$

wherein $\hat{G}_E(f_n)$ corresponds to the estimate of the complex weight $G_E(f_n)$. As discussed above, the estimated external echo audio spectrum may be a complex spectrum $E_E$ or a magnitude spectrum $\|\hat{E}_E\|$. For instance, the magnitude value (i.e. modulus or absolute level of $E_E(f_n)$), or to $\|\hat{E}_E(f_n)\|$ corresponds to $|\hat{E}_E(f_n)|$ (i.e. modulus or absolute level of $\hat{E}_E(f_n)$), or to $|E_E(f_n)|^2$ (i.e. power of $E_E(f_n)$). If the estimated external echo audio spectrum corresponds to a magnitude spectrum $\|\hat{E}_E\|$, it can be computed based on each estimated magnitude weight $\|\hat{G}_E(f_n)\|$ as follows:

$$\|\hat{E}_E(f_n)\|=\|\hat{G}_E(f_n)\|\|S_I(f_n)\|$$

For instance, the choice of estimating a complex spectrum $\hat{E}_E$ or a magnitude spectrum $\|\hat{E}_E\|$ depends on how the correction is performed in step S230. If the goal of the correction is to actually remove (subtract) the estimated echo audio spectrum from the external audio spectrum $S_E$, then a complex spectrum $\hat{E}_E$ may be estimated, by determining estimated complex weights $\hat{G}_E(f_n)$. If the goal is to attenuate frequency components of the external audio spectrum $S_E$ which include echo, then estimating a magnitude spectrum $\|\hat{E}_E\|$ is sufficient, by determining estimated magnitude weights $\|\hat{G}_E(f_n)\|$.

Generally, the determination of the estimates $\hat{G}_E(f_n)$ or $\|\hat{G}_E(f_n)\|$ (which yield the estimates $\hat{E}_E$ or $\|\hat{E}_E\|$) may use any estimation method known to the skilled person, and the choice of a specific estimation method corresponds to a specific and non-limitative embodiment of the present disclosure.

For instance, the complex weights $G_E(f_n)$ may be estimated by searching for the estimated complex weight $\hat{G}_E(f_n)$ which minimizes a distance with the external audio spectrum $S_E$, for instance according to the following expression:

$$E[|S_E(f_n)-\hat{G}_E(f_n)S_I(f_n)|^2]$$

This corresponds to a classic least mean square problem for linear model identification that can be solved for instance by using a frequency domain normalized least mean square (NLMS) filter, or any frequency domain adaptive filter known to the skilled person.

As discussed above, the estimated complex weights $\hat{G}_E(f_n)$ directly yield the estimated external echo audio (complex) spectrum $\hat{E}_E$ as follows:

$$\hat{E}_E(f_n)=\hat{G}_E(f_n)S_I(f_n)$$

The correction of the external audio spectrum, during step S230, may for instance correspond to an echo cancellation, in which case it may be carried out by subtracting (on a frequency by frequency basis) the estimated external echo audio (complex) spectrum from the external audio spectrum. The corrected external audio spectrum, designated by $\hat{S}_E$, may be expressed as follows (with $f_{min} \leq f_n \leq f_N$):

$$\hat{S}_E(f_n)=S_E(f_n)-\hat{G}_E(f_n)S_I(f_n)$$

It should be noted that other expressions may also be used when the correction corresponds to an echo cancellation. For instance, it is possible to compute a weighted subtraction seeking to reduce the echo in the external audio spectrum without necessarily seeking to completely remove it from the external audio spectrum.

As discussed above, in some cases, it can be sufficient to estimate the magnitude weights $\|G_E(f_n)\|$ and the external echo audio (magnitude) spectrum $\|E_E\|$. For instance, the magnitude weights $\|G_E(f_n)\|$ may be estimated recursively, and for each iteration k:

$$\|\hat{G}_E(f_n)\|_k = \alpha\|\hat{G}_E(f_n)\|_{k-1}+(1-\alpha)(\|S_E(f_n)\|)$$

wherein $0<\alpha<1$ is a smoothing constant. In this example, a new iteration is executed each time the estimated magnitude weights $\|\hat{G}_E(f_n)\|$ need to be updated, for instance for each audio frame or group of audio frames, or each time a predetermined updating criterion is satisfied (for instance linked to whether or not an echo is present), etc.

As discussed above, the estimated magnitude weights $\|\hat{G}_E(f_n)\|$ directly yield the estimated external echo audio (magnitude) spectrum $\|\hat{E}_E\|$ as follows:

$$\|\hat{E}_E(f_n)\|=\|\hat{G}_E(f_n)\|\|S_I(f_n)\|$$

In such a case, the correction of the external audio spectrum, during step S230, may correspond to an echo suppression, in which case it may seek to attenuate frequency components of the external audio spectrum $S_E$ which are impacted by echo. In such a case, the estimated external echo audio (magnitude) spectrum $\|\hat{E}_E\|$ may be used, during step S230, to compute echo suppression gains that will subsequently be applied to the external audio spectrum. According to a non-limitative example, computing echo suppression gains first comprises estimating, for each frequency $f_n$ (with $f_{min} \leq f_n \leq f_N$), a signal to echo ratio. For instance, the signal to echo ratio estimates $\widehat{SER}(f_n)$ (with $f_{min} \leq f_n \leq f_N$) may be determined as follows:

$$\widehat{SER}(f_n) = \frac{\|S_E(f_n)\|}{\|\hat{G}_E(f_n)\|\|S_I(f_n)\|}$$

The signal to echo ratio estimates $\widehat{SER}(f_n)$ may then be used to determine the echo suppression gains $G_M(f_n)$ for attenuating the magnitude of the frequency components of the external audio spectrum which are impacted by echo. For instance, the echo suppression gains $G_M(f_n)$ can be computed by using a predetermined gain mapping function $g_M$:

$$G_M(f_n)=g_M(\widehat{SER}(f_n))$$

Figure 3:
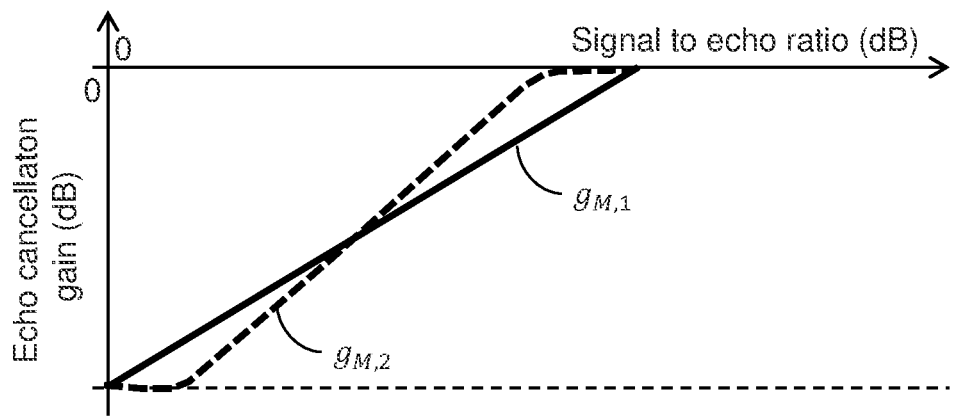
FIG. 3: a plot representing gain matching functions that can be used to compute echo suppression gains.

FIG. 3 represents schematically two non-limitative examples for the gain mapping function, designated respectively $g_{M,1}$ and $g_{M,2}$. In FIG. 3, the echo suppression gains are in decibels (dB) and, since they aim mainly at attenuating frequency components of the external audio spectrum $S_E$ which are impacted by echo, the echo suppression gains are lower than or equal to 0 dB.

The echo suppression gains $G_M(f_n)$ are then applied by multiplying (on a frequency by frequency basis) the computed echo suppression gains to the estimated external echo audio (complex) spectrum to the external audio (complex) spectrum. The corrected external audio spectrum, designated by $\hat{S}_E$, may be expressed as follows (with $f_{min} \leq f_n \leq f_N$):

$$\hat{S}_E(f_n)=G_M(f_n)S_E(f_n)$$

The echo suppression gains $G_M(f_n)$ are real numbers (vs. complex numbers) which modify only the magnitudes of the external audio spectrum.

Several non-limitative examples have been provided hereinabove for steps S220 and S230. It should be noted that other examples are possible for estimating the echo audio spectrum of the echo audio signal in the external audio signal (step S220) and for correcting the external audio spectrum (step S230).

As discussed above, the proposed solution, as illustrated by FIG. 2, can be used as a standalone echo mitigation (cancellation or suppression) solution which uses the internal audio signal as echo reference, or in combination with conventional echo cancellation algorithms which use the speaker audio signal as echo reference. For instance, such conventional echo cancellation algorithms can be used for cancelling echo:

in the external audio signal only, or
in the internal audio signal only, or
in both the external audio signal and the internal audio signal.

Since the proposed solution aims at mitigating echo in the external audio signal by using the internal audio signal, echo cancellation based on the speaker audio signal, when present, is preferably performed at least on the external audio signal, and preferably before applying the proposed solution.

Figure 4:
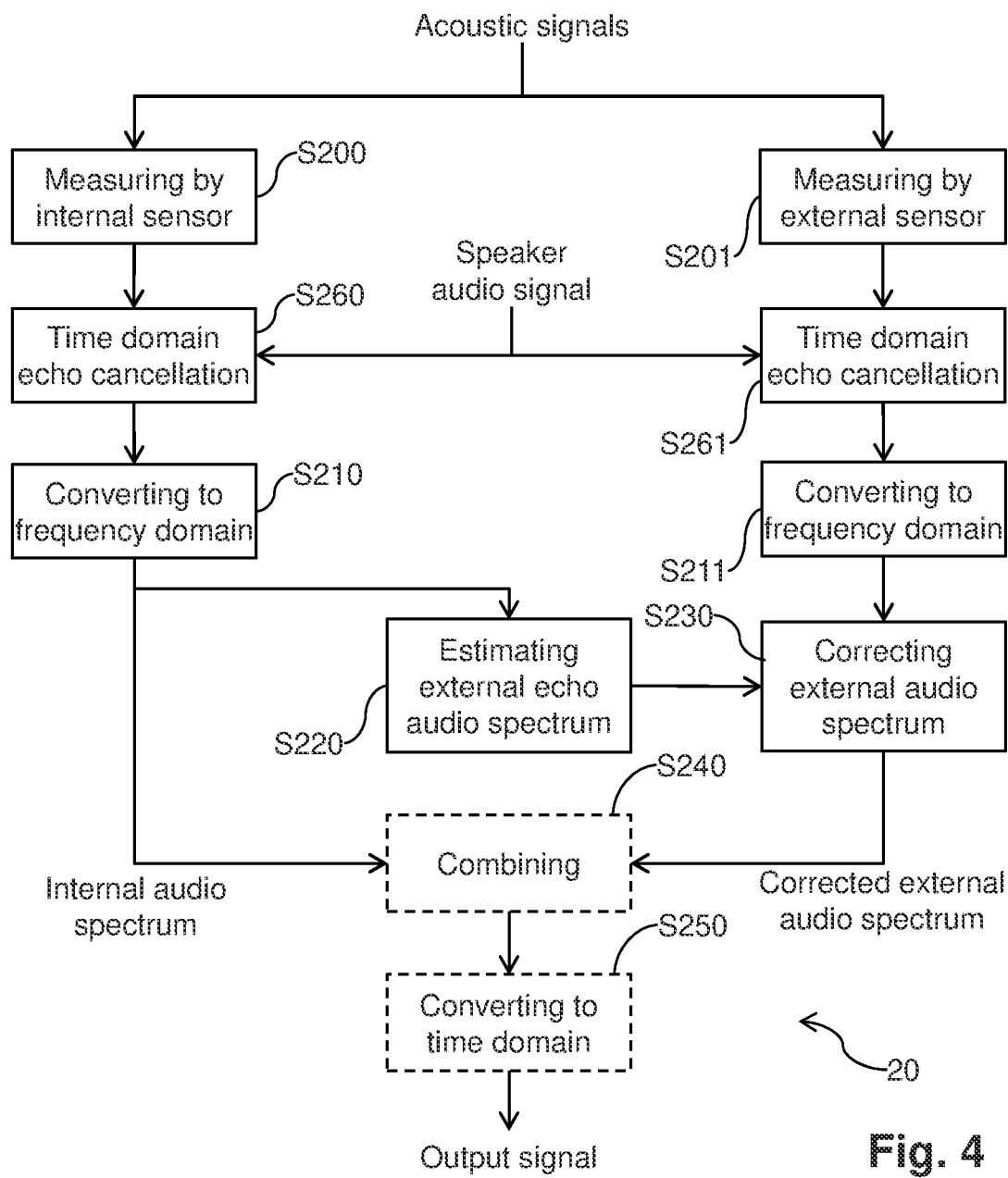
FIG. 4: a diagram representing the main steps of a second exemplary embodiment of the audio signal processing method.

FIG. 4 represents schematically the main steps of an exemplary embodiment of the audio signal processing method 20, in which echo cancellation based on the speaker audio signal (i.e. the audio signal provided as input to the speaker unit 13) is carried out on both the external audio signal and the internal audio signal. In addition to the steps discussed in relation to FIG. 2, the audio signal processing method 20 in FIG. 4 comprises:
 a step S260 of performing echo cancellation on the internal audio signal based on the speaker audio signal,
 a step S261 of performing echo cancellation on the external audio signal based on the speaker audio signal.

In the example illustrated by FIG. 4, the echo cancellation on the external audio signal based on the speaker audio signal (step S261) is carried out before correcting the external audio spectrum (step S230). In the example illustrated by FIG. 4, the echo cancellation on the external audio signal based on the speaker audio signal (step S261) is further carried out in time domain and is therefore performed before converting the external audio signal to frequency domain (step S211).

In the example illustrated by FIG. 4, the echo cancellation on the internal audio signal based on the speaker audio signal (step S260) is carried out before estimating the external echo audio spectrum based on the internal audio spectrum (step S220). In the example illustrated by FIG. 4, the echo cancellation on the internal audio signal based on the speaker audio signal (step S260) is further carried out in time domain and is therefore performed before converting the internal audio signal to frequency domain (step S210).

Generally speaking, each of steps S260 and S261 may use any echo cancellation method based on the speaker audio signal known to the skilled person, and the choice of a specific echo cancellation method corresponds to a specific and non-limitative embodiment of the present disclosure.

In some examples, each of step S260 and step S261 may for instance adaptive filtering techniques, for instance based on a least mean square (LMS) filter or based on a NLMS filter. For instance, performing echo cancellation on the external audio signal (resp. internal audio signal) based on the speaker audio signal comprises filtering the speaker audio signal by a first adaptive filter (resp. second adaptive filter), for instance using the external audio signal (resp. internal audio signal) as reference for computing the error, and correcting the external audio signal (resp. internal audio signal) based on the filtered speaker audio signal.

Figure 5:
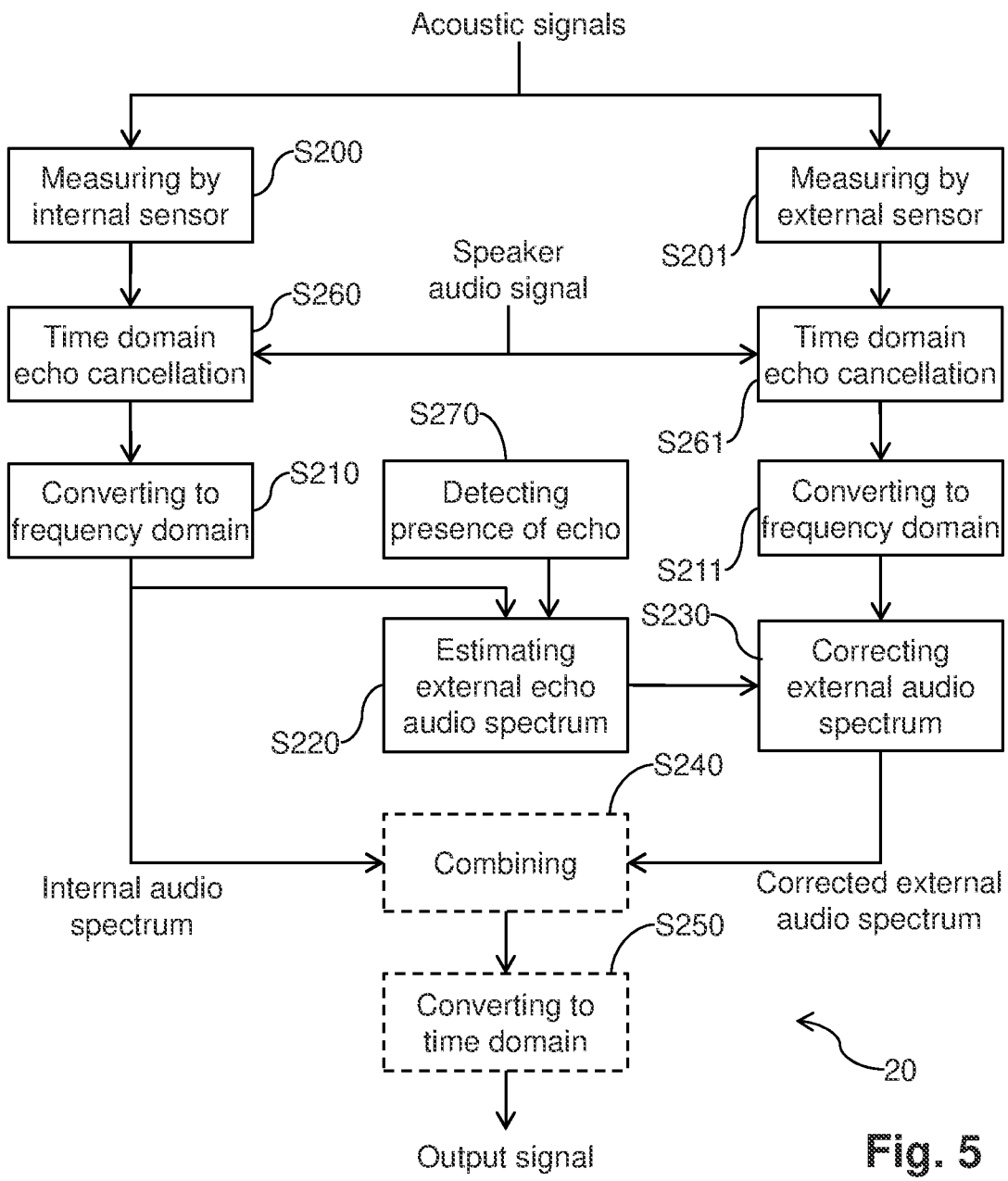
FIG. 5: a diagram representing the main steps of a third exemplary embodiment of the audio signal processing method.

FIG. 5 represents schematically the main steps of an exemplary embodiment of the audio signal processing method 20. In addition to the steps discussed in relation to FIG. 2, the audio signal processing method 20 in FIG. 5 comprises an optional step S270 of determining whether or not an echo audio signal is present. Indeed, if there is no echo audio signal in the current audio frame, then it is not necessary to correct the external audio spectrum (step S230). In other words, correcting the external audio spectrum (step S230) is performed only when it is determined during step S270 that an echo audio signal is present in the current audio frame. Also, if the correction of step S230 is not performed, then other steps need not to be executed. For instance, if the correction (step S230) is not performed for the current audio frame, then it is not necessary to estimate the external echo audio spectrum (step S220) (for instance, it is not necessary to perform an iteration when the magnitude weights $\|G_E(f_n)\|$ are estimated recursively, etc.).

Determining whether or not an echo audio signal is present may use any echo detection method known to the skilled person, and the choice of a specific echo detection method corresponds to a specific and non-limitative embodiment of the present disclosure. For instance, it is possible the determine a level of the speaker audio signal. If the level of the speaker audio signal is low, then it is likely that no echo audio signal is present in the external audio signal. In turn, if the level of the speaker audio signal is high, then it can be considered that an echo audio signal is present in the external audio signal.

In the example illustrated by FIG. 5, the audio signal processing method 20 comprises also the optional echo cancellation steps S260 and S261 which use the speaker audio signal. In such a case, it is possible to determine whether or not an echo audio signal is present in the current audio frame by e.g. comparing an output power of the internal audio signal (resp. external audio signal) after the echo cancellation step S260 (resp. step S261) with an input power of the internal audio signal (resp. external audio signal) before the echo cancellation step S260 (resp. step S261). For instance, if a ratio between the output power and the input power is low (close to 0), then this indicates that the internal audio signal (resp. external audio signal) is mostly echo and it can be considered that an echo audio signal is present in the external audio signal. In turn, if the ratio between the output power and the input power is high (close to 1), then this indicates that the internal audio signal (resp. external audio signal) is mostly not echo and it can be considered that no echo audio signal is present in the external audio signal.

Hence, the proposed audio signal processing method 20 enhances the mitigation, in the external audio signal, of components of the echo which are non-linear with respect to the speaker audio signal fed to the speaker unit 13.

In some embodiments, it is also possible to combine the corrected external audio signal (obtained after step S230) with the internal audio signal for e.g. mitigating noise. In such a case, and as illustrated by FIGS. 2, 4 and 5, the audio signal processing method 20 further comprises an optional step S240 of producing an output signal by combining the corrected external audio signal with the internal audio signal. For instance, the output signal is obtained by using the internal audio signal below a cutoff frequency and using the corrected external audio signal above the cutoff frequency. Typically, the output signal may be obtained by:
 low-pass filtering the internal audio signal based on the cutoff frequency,
 high-pass filtering the corrected external audio signal based on the cutoff frequency,
 adding the respective results of the low-pass filtering of the internal audio signal and of the high-pass filtering of the corrected external audio signal to produce the output signal.

For instance, the cutoff frequency may be a static frequency, which is preferably selected beforehand. Preferably, the cutoff frequency is lower than or equal to the minimum frequency $f_{min}$, since the corrected external audio signal can be supposed to comprise less echo above the minimum frequency $f_{min}$ than the internal audio signal.

According to another example, the cutoff frequency may be dynamically adapted to the actual noise conditions. For instance, the setting of the cutoff frequency may use the method described in U.S. patent application Ser. No. 17/667,041, filed on Feb. 8, 2022, the contents of which are hereby incorporated by reference in its entirety.

It should be noted that the combining of the corrected external audio signal with the internal audio signal may be performed in time domain or in frequency domain. Since the echo mitigation using the internal audio signal as echo reference uses frequency domain signals, it is advantageous to combine the corrected external audio signal with the internal audio signal in frequency domain, as illustrated by FIGS. 2, 4 and 5. In such a case, the internal audio signal and the corrected external audio signal are combined by combining the internal audio spectrum and the corrected external audio spectrum, thereby producing an audio spectrum of the output signal, referred to as output audio spectrum. For instance, if the cutoff frequency is lower than or equal to the minimum frequency $f_{min}$, the output audio spectrum can be substantially identical to the corrected external audio spectrum for at least frequencies above said minimum frequency $f_{min}$.

When the combining is performed in frequency domain, and as illustrated by FIGS. 2, 4 and 5, the audio signal processing method 20 can for instance further comprise a step S250 of converting to time domain the output spectrum, to produce the output signal in time domain.

When the combining is performed in time domain, then the audio signal processing method 20 can for instance comprise, before the combining step S240, a step, not represented in the figures, of converting to time domain the corrected external audio spectrum which produces the corrected external audio signal which can be combined with the internal audio signal in time domain.

It is emphasized that the present disclosure is not limited to the above exemplary embodiments. Variants of the above exemplary embodiments are also within the scope of the present invention.

For instance, the present disclosure has been provided by considering mainly an echo mitigation solution, using the internal audio signal as echo reference, which is carried out in frequency domain. Indeed, implementing the proposed echo mitigation solution in frequency domain is particularly advantageous, in particular because it facilitates the mitigation of echo in a frequency selective manner above the minimum frequency $f_{min}$. However, in other embodiments, the proposed echo mitigation solution, which uses the internal audio signal as echo reference, can also be carried out in time domain.

The invention claimed is:

1. An audio signal processing method implemented by an audio system which comprises at least an internal sensor, an external sensor and a speaker unit, wherein the internal sensor is arranged to measure voice acoustic signals emitted by a user of the audio system which reach the internal sensor by propagating internally to a head of the user and the external sensor is arranged to measure voice acoustic signals emitted by the user which reach the external sensor by propagating externally to the user's head, wherein the audio signal processing method comprises:
producing an internal audio signal and an external audio signal by measuring simultaneously acoustic signals reaching the internal sensor and acoustic signals reaching the external sensor, respectively, wherein the audio system is an earbud or headphone device,
converting the internal audio signal to frequency domain, thereby producing an internal audio spectrum,
converting the external audio signal to frequency domain, thereby producing an external audio spectrum,
estimating, based on the internal audio spectrum, an echo audio spectrum of an echo audio signal caused by the speaker unit in the external audio signal, wherein the echo audio spectrum is estimated for frequencies above a minimum frequency, wherein the minimum frequency is greater than higher or equal to 600 hertz, and wherein the internal audio spectrum, the external audio spectrum and the echo audio spectrum are complex spectra,
correcting the external audio spectrum for frequencies above the minimum frequency, based on the echo audio spectrum, including subtracting the echo audio spectrum from the external audio spectrum for frequencies above the minimum frequency, and
combining the corrected external audio spectrum with the internal audio spectrum to produce an output audio spectrum.

2. The audio signal processing method according to claim 1, wherein the internal audio signal and the external audio signal obtained after correcting the external audio spectrum based on the echo audio spectrum are combined in frequency domain by combining the internal audio spectrum and the external audio spectrum obtained after correction based on the echo audio spectrum, thereby producing an output audio spectrum.

3. The audio signal processing method according to claim 2, wherein the output audio spectrum corresponds to the external audio spectrum obtained after correction based on the echo audio spectrum for frequencies above the minimum frequency.

4. The audio signal processing method according to claim 1, wherein the echo audio spectrum is estimated by filtering the internal audio spectrum by a frequency domain adaptive filter.

5. The audio signal processing method according to claim 1, wherein correcting the external audio spectrum based on the echo audio spectrum comprises:
computing echo suppression gains based on the external audio spectrum and based on the echo audio spectrum, for frequencies above the minimum frequency, and
applying the echo suppression gains to the external audio spectrum, for frequencies above the minimum frequency.

6. The audio signal processing method according to claim 1, further comprising performing echo cancellation on the external audio signal based on a speaker audio signal, before correcting the external audio spectrum based on the echo audio spectrum estimated based on the internal audio spectrum.

7. The audio signal processing method according to claim 6, further comprising performing echo cancellation on the internal audio signal based on the speaker audio signal, before estimating the echo audio spectrum based on the internal audio spectrum.

8. The audio signal processing method according to claim 1, further comprising determining whether an echo audio signal is present,
wherein the correction of the external audio spectrum, based on the echo audio spectrum estimated based on the internal audio spectrum, is performed only when it is determined that an echo audio signal is present.

9. An audio system comprising at least an internal sensor, an external sensor and a speaker unit, wherein the internal sensor is arranged to measure voice acoustic signals emitted by a user of the audio system which reach the internal sensor by propagating internally to a head of the user and the external sensor is arranged to measure voice acoustic signals emitted by the user which reach the external sensor by propagating externally to the user's head, wherein the internal sensor and the external sensor are configured to produce an internal audio signal and an external audio signal by measuring simultaneously acoustic signals reaching the internal sensor and acoustic signals reaching the external sensor, respectively, wherein said audio system further comprises a processing circuit configured to:
- convert the internal audio signal to frequency domain, thereby producing an internal audio spectrum, wherein the audio system is an earbud or headphone device,
- convert the external audio signal to frequency domain, thereby producing an external audio spectrum,
- estimate, based on the internal audio spectrum, an echo audio spectrum of an echo audio signal caused by the speaker unit in the external audio signal, wherein the echo audio spectrum is estimated for frequencies above a minimum frequency, wherein the minimum frequency is greater than or equal to 600 hertz, and wherein the internal audio spectrum, the external audio spectrum and the echo audio spectrum are complex spectra,
- correct the external audio spectrum for frequencies above the minimum frequency, based on the echo audio spectrum, including subtracting the echo audio spectrum from the external audio spectrum for frequencies above the minimum frequency, and
- combining the corrected external audio spectrum with the internal audio spectrum to produce an output audio spectrum.

10. The audio system according to claim 9, wherein the internal audio signal and the external audio signal obtained after correcting the external audio spectrum based on the echo audio spectrum are combined in frequency domain by combining the internal audio spectrum and the external audio spectrum obtained after correction based on the echo audio spectrum, thereby producing an output audio spectrum.

11. The audio system according to claim 10, wherein the output audio spectrum corresponds to the external audio spectrum obtained after correction based on the echo audio spectrum for frequencies above the minimum frequency.

12. The audio system according to claim 9, wherein the processing circuit is configured to estimate the echo audio spectrum by filtering the internal audio spectrum by a frequency domain adaptive filter.

13. The audio system according to claim 9, wherein the processing circuit is configured to correct the external audio spectrum based on the echo audio spectrum by:
- computing echo suppression gains based on the external audio spectrum and based on the echo audio spectrum, for frequencies above the minimum frequency, and
- applying the echo suppression gains to the external audio spectrum, for frequencies above the minimum frequency.

14. The audio system according to claim 9, wherein the processing circuit is further configured to perform echo cancellation on the external audio signal based on a speaker audio signal, before correcting the external audio spectrum based on the echo audio spectrum estimated based on the internal audio spectrum.

15. The audio system according to claim 14, wherein the processing circuit is further configured to perform echo cancellation on the internal audio signal based on the speaker audio signal, before estimating the echo audio spectrum based on the internal audio spectrum.

16. The audio system according to claim 9, wherein the processing circuit is further configured to: determine whether an echo audio signal is present, and perform the correction of the external audio spectrum, based on the echo audio spectrum estimated based on the internal audio spectrum, only when it is determined that an echo audio signal is present.

17. A non-transitory computer readable medium comprising computer readable code to be executed by an audio system comprising at least an internal sensor, an external sensor and a speaker unit, wherein the internal sensor is arranged to measure voice acoustic signals emitted by a user of the audio system which reach the internal sensor by propagating internally to a head of the user and the external sensor is arranged to measure voice acoustic signals emitted by the user which reach the external sensor by propagating externally to the user's head, wherein said audio system further comprises a processing circuit, wherein said computer readable code causes said audio system to:
- produce an internal audio signal and an external audio signal by measuring simultaneously acoustic signals reaching the internal sensor and acoustic signals reaching the external sensor, respectively, wherein the audio system is an earbud or headphone device,
- convert the internal audio signal to frequency domain, thereby producing an internal audio spectrum,
- convert the external audio signal to frequency domain, thereby producing an external audio spectrum,
- estimate, based on the internal audio spectrum, an echo audio spectrum of an echo audio signal caused by the speaker unit in the external audio signal, wherein the echo audio spectrum is estimated for frequencies above a minimum frequency, wherein the minimum frequency is greater than or equal to 600 hertz, and wherein the internal audio spectrum, the external audio spectrum and the echo audio spectrum are complex spectra,
- correct the external audio spectrum for frequencies above the minimum frequency, based on the echo audio spectrum, including subtracting the echo audio spectrum from the external audio spectrum for frequencies above the minimum frequency, and
- combining the corrected external audio spectrum with the internal audio spectrum to produce an output audio spectrum.

18. The non-transitory computer readable medium according to claim 17, wherein the internal audio signal and the external audio signal obtained after correcting the external audio spectrum based on the echo audio spectrum are combined in frequency domain by combining the internal audio spectrum and the external audio spectrum obtained after correction based on the echo audio spectrum, thereby producing an output audio spectrum.

19. The non-transitory computer readable medium according to claim 18, wherein the output audio spectrum corresponds to the external audio spectrum obtained after correction based on the echo audio spectrum for frequencies above the minimum frequency.

20. The non-transitory computer readable medium according to claim 17, wherein the echo audio spectrum is estimated by filtering the internal audio spectrum by a frequency domain adaptive filter.

21. The non-transitory computer readable medium according to claim 17, wherein correcting the external audio spectrum based on the echo audio spectrum comprises:
   computing echo suppression gains based on the external audio spectrum and based on the echo audio spectrum, for frequencies above the minimum frequency, and
   applying the echo suppression gains to the external audio spectrum, for frequencies above the minimum frequency.

* * * * *